Dec. 22, 1925.                                                1,566,280
H. W. LORMOR
STORAGE BATTERY GRID
Filed Feb. 18, 1924
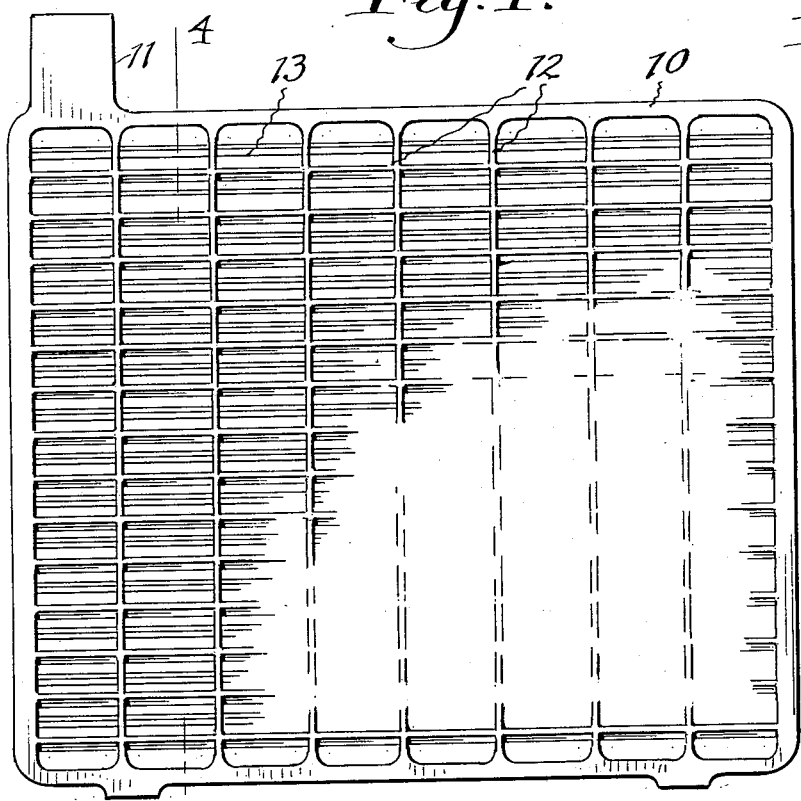
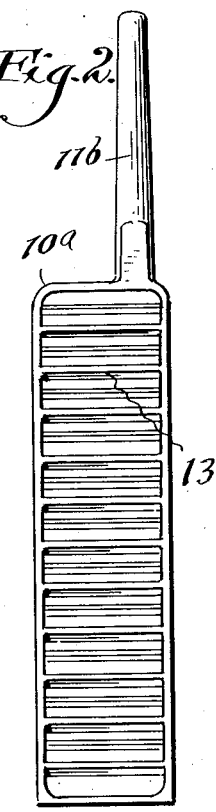
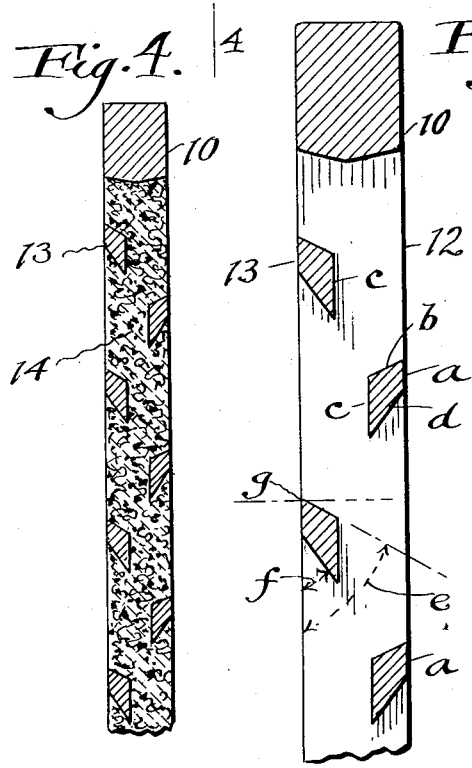
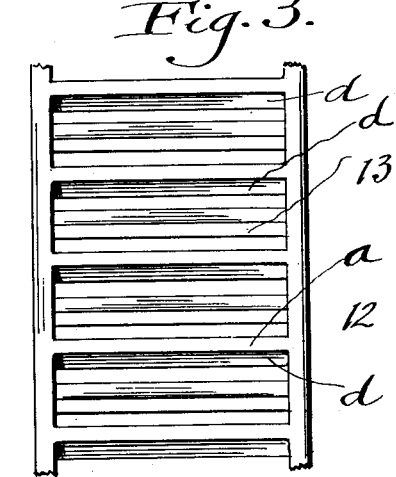
Inventor
Henry W Lormor.
By Thurston Kwon & Hudson
Attorneys Patented Dec. 22, 1925.

1,566,280

UNITED STATES PATENT OFFICE.

HENRY W. LORMOR, OF CLEVELAND, OHIO, ASSIGNOR TO WILLARD STORAGE BATTERY COMPANY, OF CLEVELAND, OHIO, A CORPORATION OF WEST VIRGINIA.

STORAGE-BATTERY GRID.

Application filed February 18, 1924. Serial No. 693,498.

*To all whom it may concern:*

Be it known that I, HENRY W. LORMOR, a citizen of the United States, residing at Cleveland, in the county of Cuyahoga and State of Ohio, have invented a certain new and useful Improvement in Storage Battery Grids, of which the following is a full, clear, and exact description.

This invention relates to storage battery grids, and has for its chief object to provide certain improvements which will give added strength to the grid, which will enable the bars to more effectively hold and support the active material not only while the battery elements are being formed, but also when the battery employing such grids is in use, and which will prolong the life of the battery.

These advantages are gained by certain improvements in the shape of the bars commonly employed for retaining or supporting the active material, as will be described in detail later.

The invention may be here briefly summarized as consisting in certain novel details of construction, or in certain novel shape or shapes, which may be imparted to the bars for supporting the paste or active material, as will be described in the specification and set forth in the appended claims.

In the accompanying sheet of drawings wherein I have shown an embodiment of the invention which answers the requirements very effectively, Fig. 1 is a face view of a grid for starting and lighting batteries; Fig 2 is a similar view of a grid for radio batteries, both grids being formed in accordance with the invention; Fig. 3 is a view similar to Fig. 2, showing a portion of the grid on an enlarged scale; Fig. 4 is an enlarged sectional view which may be assumed to be along the line 4—4 of Fig. 1, this view showing the paste applied to the grid; and Fig. 5 is a similar view on a slightly larger scale. with the paste omitted.

My improvements may be employed in batteries having plates of the pasted grid type, regardless of their size or uses. In Figs. 1 and 2 I have shown grids for two types and sizes of batteries, namely, starting and lighting and radio batteries.

The grid shown in Fig. 1 includes the usual rectangular frame 10, from one of the upper corners of which extends a lug 11, by which the grid may be attached to a strap to connect it to similar grids of like polarity, and from which strap a terminal post may extend through the cover of the jar or other container of the battery or cell. This grid is also provided with a series of spaced vertical bars 12, between which are horizontal ribs 13, embodying the invention. The grid shown in Fig. 2 has a rectangular frame $10^a$, from which extends a terminal or terminal post $11^b$, and the upright sides of the frame $10^a$ are connected together by the improved ribs 13, the vertical bars 12 of Fig. 1 being omitted. These grids can be cast singly or in groups of two or more. Generally the starting and lighting grids are cast in pairs, and the smaller grids, such as for radio batteries, are cast in groups of ten, more or less.

The improvements lie in the cross-sectional shape of the ribs 13, which it will be observed, particularly by reference to Figs. 4 and 5, are elongated in cross-section, and are disposed on opposite sides of the grid in more or less inclined position extending in a general direction upwardly and outwardly so as to give a reverse shutter effect.

In this instance, each rib has four faces, $a$, $b$, $c$ and $d$. The face $a$, which is at the outer surface of the grid, is parallel with the opposite inner face $c$, but has less width or depth than the latter. The upper face $b$ and the lower face $d$, are both inclined to the outer face of the grid, the face $d$ being at a more acute angle than the face $b$. In this instance the angle $e$ which the face $b$ makes with the outer face of the grid is about 60°, and the angle $f$ which the face $d$ makes with the outer face of the grid is about 30°, but these angles may be varied, those indicated in the drawings being specific angles which in practice have proven to be satisfactory.

The most important feature of the construction is the fact that both the sides $b$ and $d$ taper downwardly from the outer face, the effect of which is to better retain the active material in the grid than with the prior shapes or construction of which I am aware. Obviously the downward and inward taper of the faces $b$ of the ribs on the right hand face of the grid will produce a wedging action tending to prevent the dislodgment of the active material from the right hand face. Obviously also, the downward and inward inclination of face $b$ of the ribs on the right hand side of the grid will tend to prevent the dislodgment of active material from the left side. In this connection it might be stated that the essential characteristic of the shape and disposition of this face is that it lies below a horizontal plane passing through the outer top edge indicated at $g$. This effect will be produced by any angle $e$ less than 90°. As far as this essential characteristic is concerned, it is not necessary that the sides $a$, $b$, $c$ and $d$ be flat, for in some instances they may be curved or rounded, and that shape may be used, but flat faces are now preferred.

Although in so far as the retention or locking in of the active material is concerned, the bars may have any suitable shape such that the angles $e$ and $f$ are less than 90°, other conditions require a shape and cross-sectional area which at least approximate the shape and cross-section illustrated. For example, the ribs must have the right cross-section to permit casting. If they are made too thin or too small in area, or cross section, imperfect ribs will be cast. Likewise, there must be sufficient area in cross-section, and the shape or disposition of the metal forming the rib must be such as to give the requisite strength to prevent breakage before pasting, and also to support the paste. In this connection it might be stated that the vertical elongation admirably adapts the rib for supporting the paste above it. Additionally it is desirable to keep down the width of the outer face of the rib, or the surface area on the outer face to avoid reducing the surface area of the active material, and therefore the capacity of the pasted plate. It is largely because of this latter consideration that the face $d$ extends from the back face $c$ at a more acute angle than the face $b$ as this reduces the width or depth and the area of face $a$ as compared with the width or depth and area of face $c$.

I might say, however, that in some instances I have made the angle $f$ less acute than that shown, and for certain batteries I have made this angle as great as 45° without materially sacrificing any advantages.

In Fig. 4 I have shown the grid filled with paste or active material, which is indicated at 14, and by reference to this figure, the paste retaining and supporting characteristics of the ribs will be most apparent.

I have found in practice that the ribs constructed or shaped in accordance with this invention not only prevent the dislodgment of active material due to sudden blows, as by dropping the plates from a height to the floor, or after the plates are assembled into battery elements and are in a battery, but due to the fact that the ribs point or extend in a general direction upwardly and outwardly, the usual shedding of active material is reduced while the battery is in service. I have found also, that these grids give an additional life to the battery, particularly as the cross-section of the rib is such that there is a marked improvement over the ribs of ordinary shape in supporting the weight of the active material, and the ability to resist the weight of material extends over a much longer period of time than is the case with all other grids of which I am aware.

While I have shown the preferred construction, I have already pointed out a number of particulars in which the shape of the ribs may be varied, and therefore I aim in my claims to cover all modifications which do not involve a departure from the spirit and scope of my invention.

Having described my invention, I claim:

1. A storage battery grid having horizontal paste retaining ribs each rib having a body portion extending downwardly and inwardly from a side of the grid.

2. A storage battery grid having on opposite sides paste retaining ribs elongated in cross-section and extending in a general direction downwardly and inwardly from the sides of the grid.

3. A storage battery grid having paste retaining ribs elongated in cross-section and diagonally disposed with reference to the sides of the grid.

4. A storage battery grid having paste retaining ribs elongated in cross-section and diagonally disposed with reference to the sides of the grid, said ribs having upper and lower faces inclined at different angles to the adjacent side of the grid.

5. A storage battery grid having paste retaining ribs with downwardly inclined top and bottom faces and a relatively narrow front face.

6. A storage battery grid having paste retaining ribs with downwardly inclined top and bottom faces and a relatively narrow front face, said top and bottom faces being arranged at different angles with the front face.

7. A storage battery grid having diagonally disposed paste retaining ribs elongated in cross-section and provided with downwardly and inwardly inclined upper and lower faces, a narrow front face, and a relatively wide rear face.

In testimony whereof, I hereunto affix my signature.

HENRY W. LORMOR.